Patented Feb. 9, 1932

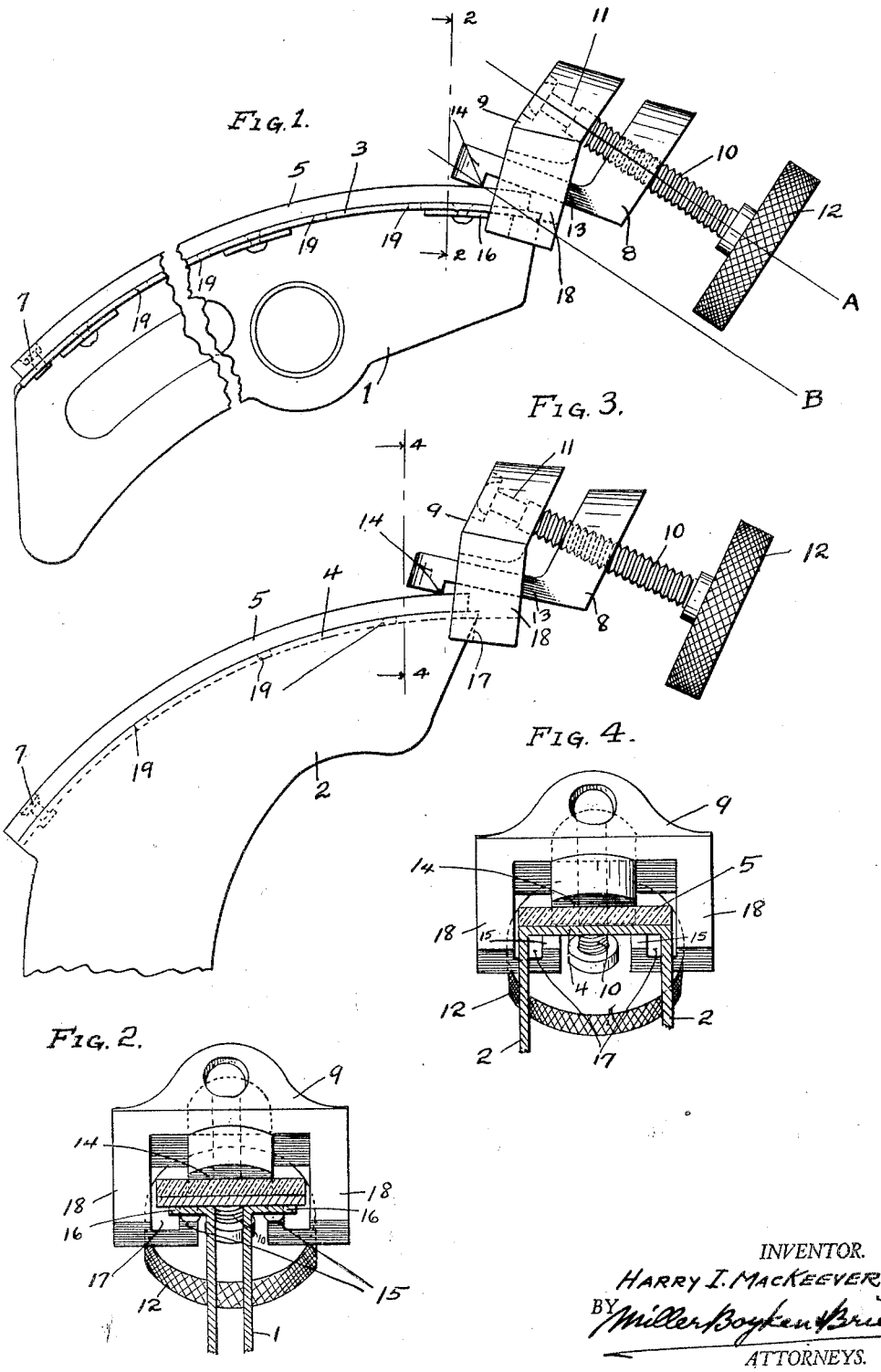

1,844,328

UNITED STATES PATENT OFFICE

HARRY I. MacKEEVER, OF SAN FRANCISCO, CALIFORNIA

BRAKE LINER CLAMP

Application filed February 1, 1930. Serial No. 425,186.

This invention relates to devices for clamping brake-lining on brake shoes of automobiles preparatory to riveting the lining in place and the objects of the invention are to provide a simple, cheap clamp which may be quickly applied, which will effectively stretch the band of lining material on the surface of the shoe, and which will not be in the way of the drilling and riveting operations.

In the drawings hereto annexed Fig. 1 is a side view of my improved clamp in place on the shoe of an internal service brake clamping and stretching the lining in place.

Fig. 2 is a cross section of Fig. 1 as seen from the line 2—2 thereof.

Fig. 3 is a view similar to that of Fig. 1 but shows the clamp at the end of the emergency brake shoe to illustrate the slightly different fulcruming position.

Fig. 4 is a cross section of Fig. 3 as seen from the line 4—4 thereof.

Before describing the invention it should be stated that in the various makes of automobiles the internal brake shoes are not all exactly alike, but they vary in the details of construction, thickness, and dimensions of the parts, but those shown in the drawings are representative of the pressed steel form of brake shoe, Fig. 1 illustrating what is known as the brake shoe of the service brakes which is comparatively long, and Fig. 2 the shorter shoe of the emergency brakes. It is understood that each wheel brake drum has two of the longer shoes and two of the shorter shoes positioned around its circumference, each set properly supported and operated by independent mechanisms forming no part of the present invention. In Fig. 1 the longer shoe is shown broken in length.

The shoes are here shown of pressed steel construction with stiffening webs 1, 2 and arcuate outer rims or plates 3, 4 to the outer surfaces of which the brake lining 5 is attached by means of rivets passing through the rims.

The lining is a band of woven asbestos material about $\frac{3}{16}$″ or more in thickness usually incorporating fine wires, and as it is tough and not very pliable it presents considerable difficulty in applying properly to the shoes as it must be forced in perfect contact with the rims of the shoes and stretched before riveting in place with copper or other soft rivets.

Various clamping devices have been in use for temporarily holding the piece of lining material in place while drilling and riveting it to the rim and most of these require that the lining be longer than the rim so that an overhanging end may be gripped by jaws of the device for stretching the material, and which projecting ends are cut off when the job is done.

Since, however, there are twelve such brake shoes on a four-wheel brake car it follows that about a dozen waste ends must be cut off, thus representing a considerable waste of expensive material every time the brakes are relined.

In applying the lining with the aid of my improved clamp all waste is avoided as I cut the strips of material to the correct length for each arcuate shoe rim, first drill and rivet one end to the shoe as shown at 7 with a couple of spaced rivets, then smooth the material against the rim by pressing against it, slip my clamp over the free end, turn one screw and stretch the material to any desirable degree tight against the rim, after which the material is further drilled and riveted.

The clamp proper consists of three pieces, jaw member 8, fulcrum member 9 and screw 10.

The fulcrum member is a block of metal arranged to bear against the end of the shoe and is provided with slots or seats or is otherwise formed to fit against the particular type and size of shoe being operated upon, and the screw is swivel jointed into the block as at 11 so that it may be freely turned but cannot push in or pull out. A large thumb nut 12 is secured to the outer end of the screw for turning the same.

The jaw member 8 has a boss through which the screw is threaded and a forwardly extending leg 13 passing through a recess in the block 9 and provided with a transversely extending sharpened jaw 14 which is adapted to dig into the lining material as it is pulled outward in turning the screw. This result is obtained on account of the axis A of the screw being inclined downwardly from the end of the shoe so that the jaw follows a similar downward path along the line B thus digging deeper into the lining to get an increasingly better grip as the lining becomes tighter.

When the screw is released the clamp is easily slipped in place over the lining by canting the jaw upward.

In Figs. 1 and 2 the block 9 is shown straddling the shoe with the inwardly turned ends 15 of the block fulcrummed against the attachment lugs 16 of the shoe web 1, but in Figs. 3 and 4 the web plates 2 of the shoe are spaced further apart and lie in short slots 17 formed in the legs 18 of the block.

The particular arrangement of the abutting or fulcrumming portions of the block will vary of course for shoes of special construction the main feature being for the block to seat itself against the end of the shoe to form a fulcrum for drawing the jaw forward and downward to grip and stretch the liner.

In actual construction the screw and other members are made very heavy so that they will not flex unduly to release the grip of the jaw from the material.

The thread of the screw is preferably right-handed so that it will be turned to the right to tighten the jaw and stretch the material, though if free in 8 and threaded in 9 the thread should be left-handed.

It is of course almost superfluous to say that the shoe rims are furnished already drilled for the rivets as at 19 and after clamping the lining as described the shoe with its clamp is placed on a drilling machine and the lining drilled and countersunk in line with the rim holes and riveted thereto before removing the clamp. The lamp being at the extreme end is not in the way of these operations.

It is evident from the above description that if desired the initial riveting of one end of the material may be dispensed with and one of my clamps applied to both ends of the material before drilling.

I claim:

1. A brake lining clamp comprising an inverted U-shaped bracket, the legs of said bracket adapted to straddle a brake shoe and to engage an end thereof, a screw projecting from the cross bar of the bracket and a member carried by the screw provided with a jaw extending between the legs of the bracket, said jaw adapted to engage the surface of a strip of brake lining in place on the rim of the shoe.

2. In a structure as specified in claim 1, the legs of said bracket extending inwardly toward each other at their ends and the inward extension of each leg being recessed to receive the webs of the shoe respectively.

3. A brake lining clamp comprising an inverted U-shaped bracket the legs of said bracket adapted to straddle a brake shoe and to engage against an end thereof, a screw revolvably secured at one end to the cross bar of the bracket at a point intermediate its ends, a member carried by said screw provided with a jaw extending between the legs of the bracket to engage the surface of a strip of brake lining in place on the rim of the shoe.

4. In a structure as specified in claim 3 the free end of said screw provided with a thumb nut for turning the same.

HARRY I. MacKEEVER.